United States Patent [19]

Eertink

[11] Patent Number: 4,505,820

[45] Date of Patent: Mar. 19, 1985

[54] METHOD FOR CLEANING WASTE WATER

[76] Inventor: Bastiaan B. Eertink, Land Van Kessel 7, 5971 Dh Grubbenvorst, Netherlands

[21] Appl. No.: 355,567

[22] PCT Filed: Jul. 20, 1981

[86] PCT No.: PCT/NL81/00019
§ 371 Date: Feb. 18, 1982
§ 102(e) Date: Feb. 18, 1982

[87] PCT Pub. No.: WO82/00633
PCT Pub. Date: Mar. 4, 1982

[30] Foreign Application Priority Data

Aug. 20, 1980 [NL] Netherlands ............. 8004724

[51] Int. Cl.$^3$ ............................................. C02F 3/26
[52] U.S. Cl. ................................. 210/604; 210/608; 210/627; 210/628
[58] Field of Search ............ 210/205, 201, 199, 202, 210/220, 218, 219, 221.1, 221.2, 252, 261, 608, 262, 620, 628, 621, 604, 626, 627; 261/93, 123; 435/313–315, 304

[56] References Cited

U.S. PATENT DOCUMENTS

| 2,804,379 | 8/1957 | Wistrich et al. | 261/93 |
| 2,824,728 | 2/1958 | Crawford | 261/121 M |
| 4,192,740 | 3/1980 | Savard et al. | 210/621 |
| 4,202,763 | 5/1980 | Shimizu et al. | 210/620 |
| 4,212,949 | 7/1980 | Kozhemyakin et al. | 435/315 |
| 4,286,065 | 8/1981 | Kaluniants et al. | 435/315 |
| 4,350,588 | 9/1982 | Tsubota | 210/262 |

FOREIGN PATENT DOCUMENTS

| 2253919 | 5/1974 | Fed. Rep. of Germany | 261/123 |
| 739000 | 6/1980 | U.S.S.R. | 210/262 |

Primary Examiner—Benoît Castel
Attorney, Agent, or Firm—Albert C. Johnston

[57] ABSTRACT

Method for cleaning waste water, wherein the waste water (19) and oxygen gas (31) are flowing in opposite directions through a cylindrical multireactor (20) having a central rotatable pipe (24), the multireactor comprising a number of bioreactors and at least one separation chamber (75). The average pressure difference between two successive bioreactors is at most seven meter water column. The bioreactors are separated from each other by stationary walls (40, 41, 48, 55, 60), and each bioreactor has its own mixing device (50) for mixing waste water and oxygen gas.

10 Claims, 4 Drawing Figures

METHOD FOR CLEANING WASTE WATER

The invention relates to a method for cleaning waste water, which makes use of a device comprising at least one multireactor, which multireactor consists of a cylindrical container, the axis of which is positioned vertically, and a rotatable central pipe coaxially positioned within the container.

Such a device is generally known and is practically used on a large scale.

In order to improve the biological cleaning of the waste water, pure oxygen or an oxygen containing gas, hereafter called oxygen gas, is supplied. The problem is that the oxygen is bubbling up relatively fast through the waste water to be cleaned and only a small part of the oxygen gas supplied is used in the biological cleaning.

It is an object of the invention to provide a method as hereinbefore defined wherein the oxygen gas is more effectively used.

According to the invention this object is achieved in that in each multireactor there are at least two bioreactors positioned above one another, and above said bioreactors there is at least one separation chamber, in that two adjacent bioreactors are separated from each other by means of a horizontal mainly annular partition wall, the outer edge thereof being connected to the inner wall of the container, and the inner diameter being somewhat larger than the outer diameter of the pipe, and in that the supply of oxygen gas is provided in the lowest bioreactor of each multireactor.

Due to the presence of the annular partition walls the bubbling up of the oxygen gas is delayed considerably, whereby it can be used more effectively. Besides by a suitable choice of the form and position of the partition wall the upward directed movement of the oxygen gas can be used for mixing the oxygen gas and the waste water.

Other characteristics and advantages will become clear from the following description, reference being made to the accompanying drawings, wherein.

Figure 1:
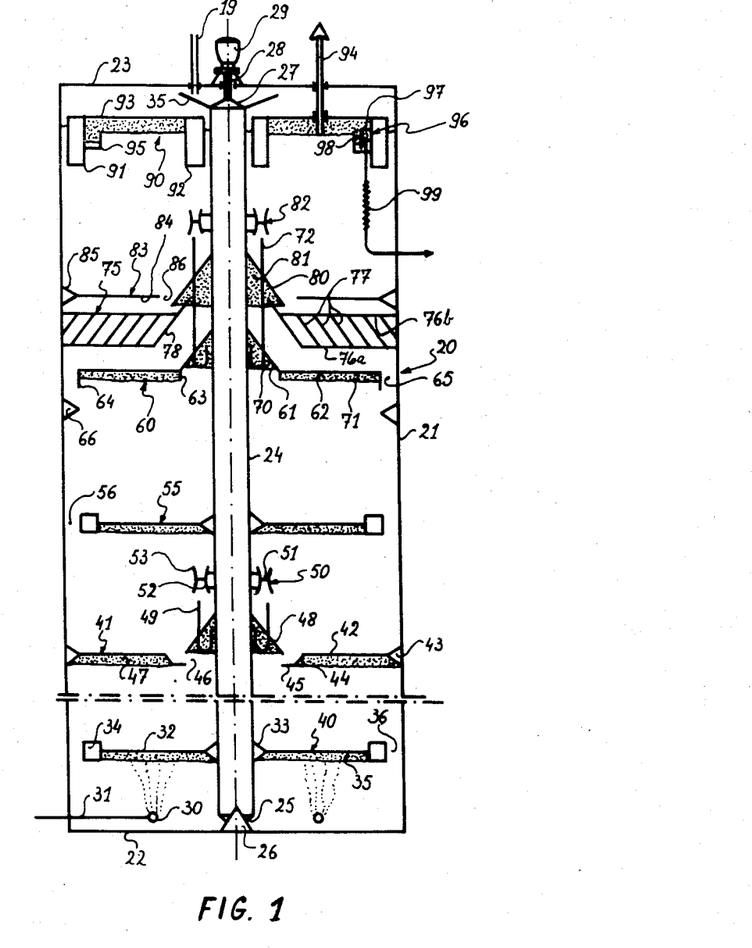
FIG. 1 is a schematic cross section of a first multireactor, as it can be provided in a waste water cleaning system according to the invention.

As represented in FIG. 1 the first multireactor comprises a cylindrical container 20, comprising a cylinder wall 21, a bottom plate 22 and an upper wall 23. With its bottom plate 22 the container 20 is resting on a foundation, not shown, in such a way that the cylinder wall 21 is positioned vertically. Coaxially with the cylinder wall 21 there is provided a hollow pipe 24 in the container 20, the bottom end of said pipe being rotatably supported by the bottom plate 22. This bottom end of the pipe 24 is constituted by a wall portion 25 having the form of a truncated cone cooperating with a conical part 26 connected to the bottom plate 22. A number of openings is provided in the wall portion 25. The upper end of the pipe 24 is also constituted by a wall portion 27 having the form of a truncated cone, which wall portion 27 is also provided with openings. A stub shaft 28 is connected with the wall portion 27, and extends through an opening in the upper wall 23, and outside the container 20 it is connected with an electromotor 29 supported by the upper wall 23. The dimensions of the parts are chosen in such a way that the wall portion 25 is not touching the conical part 26, but that the pipe 24 is mainly supported by the support of the motor 29. Around the upper end of the pipe 24 a funnel shaped plate 35 is provided, whereby the liquid contained therein is drained away through the openings in the wall portion 25. Waste water is added via pipe 19.

In the container 20 a number of horizontally positioned annular partition plates is provided, which either are connected to the inner side of the cylinder wall 21 or to the pipe 24, thereby dividing the container into a number of reaction spaces. In the lowest part of the container 20 a supply system for oxygen gas is provided, which system in the embodiment shown comprises a circularly formed pipe 30 provided with a number of openings and a supply pipe 31, one end of which is connected to the circularly formed pipe 30, and the other end extending outside the container 20 and being connected to a system (not shown) for supplying the oxygen gas.

As seen from the bottom upwards the first partition wall 40 in the container 20 is formed by an annular plate 32 which is fixed to the pipe 24 by means of a ring 33 with triangular cross section. A ring 34 with rectangular cross section is connected to the outer edge of plate 32, whereby a space with U-shaped cross section is formed under plate 32, in which space gas can be accumulated. Ring 34 has an outer diameter which is smaller than the inner diameter of the cylinder wall 21, thereby forming an annular opening 36 between ring 34 and wall 41 through which waste water can flow. Preferably ring 34 comprises two concentric rings, which are interconnected by a number of blades at an oblique angle with respect to the perpendicular direction, thereby forming a paddle wheel.

The next partition wall 41, as seen from the bottom upwards is formed by an annular plate 42, the outer edge of which is connected to the inner side of the cylinder wall 21 by means of a ring 43 with triangular cross section. The inner edge of the plate 42 is formed by a conical downwardly sloping portion 44, which is further connected to an annular horizontal portion 45. The inner diameter of portion 45 is larger than the outer diameter of pipe 44 thereby forming an annular opening 46 through which waste water is allowed to flow. By this form of the partition wall 41 a space is formed at its underside in which gas can be accumulated.

Above the opening 44 there is a conical wall 48, its edge with the smallest diameter being fixed to the pipe 24, whereas the lower positioned outer edge has a diameter which is slightly larger than the inner diameter of the portion 45. A number of openings is provided in wall 48 and an equal number of pipes 49 project through said openings. The parts of the pipes 49 extending above wall 48 have their ends all at the same level above wall 48. The part of each pipe 49 extending under wall 48 is U-shaped bent and ends near the connection between wall 48 and pipe 24. In this way siphon-like cut offs are formed, through which the gas accumulated under wall 48 can flow upwardly to the next multireactor.

Above the parts of the pipes 49 extending upwardly beyond the wall 48 there is provided a diffusor 50 by which the gas bubbles coming from the pipes 48 are atomised into smaller bubbles. The diffusor 50 comprises two annular walls 52 and 53 which are connected by means of brackets 51. The walls 52 and 53 have a cross section in the shape of a part of a circle and are opposed with their convex sides thereby forming a narrowing-widening flowing section. The diffusor 50 is fixed to the pipe 24.

A partition wall 55 situated above diffusor 50 has a construction which is identical to the construction of the partition wall 40, an annular opening 56 being formed between the wall 55 and the cylinder wall 21. Above the partition wall 55 there is a partition wall 60. The partition wall 60 comprises a conical part 61, its construction being identical to the wall 48 and itself being fixed to the pipe 24. To the outer edge of part 61 there is connected a horizontal annular plate 62.

To the inner and outer edge respectively of the plate 62 there is provided a downwardly directed flange 63 and 64 respectively, flange 64 being directed more downwardly than flange 63.

By a suitable choice of the diameters an annular opening 65 is formed between flange 64 and the cylinder wall 21. Under the opening 65 and to the inner side of the wall 21 there is formed an annular projection 66 having a triangular cross section. Hereby it is prevented that gas bubbles flow upwardly immediately through the opening 65. The gas bubbles are interrupted either in the space 70 under the conical part 61, or in the space 71 formed by the plate 62 and the flanges 63 and 64. In the conical part 61 a number of siphon-like pipes 72 is provided corresponding to pipes 49 in the wall 48.

Above the partition wall 60 there is provided a settling device 75. The settling device 75 comprises a number of equally spaced concentric plates 77 with a truncated conical cross section, the edge with the larger diameter being at the underside. The under edges of these plates 77 are fixed to a number of spokelike horizontal bars 76a which are fixed to the wall 21. The upper edges of the plates also are fixed to a number of spokelike horizontal bars 76b which are also fixed to the wall 21. To the inner ends of the spokes 76a and 76b an inner concentric ring 78 is provided. The under edge of said ring 78 lies in the same horizontal plane as the under edges of the rings 77 and the spokes 76a. The upper end of the ring 78 extends upwardly above the horizontal plane formed by the upper end of the rings 77 and the spokes 76b.

Above the settling device 75 there is a wall 80 corresponding to wall 48 but having an outer diameter larger than the inner diameter of the truncated conical wall formed by ring 78, wall 83 and ring 78 together forming siphon sealing. This means that the ring 78 extends into the space 81 formed by wall 80, the pipe 24 and the horizontal plane corresponding to the under edge of the wall 80. The pipes 72 extend upwardly above the wall 80, and above the pipes 72 there is a diffusor 82 corresponding to the diffusor 50.

Above the settling device 75 there is also provided a partition wall 83 comprising an annular plate 84 which by means of a ring 85 with triangular cross section is fixed to the inner side of the cylinder wall 21. The partition wall 83 is positioned at a somewhat higher level than the under edge of the wall 80, and the inner diameter of the annular plate 84 is larger than the diameter of the wall 80 at that height, thereby forming an annular opening 86.

In the top portion of the container 20 there is provided a float 90. The float 90 comprises two annular airtight containers 91 and 92 the upper sides of which are connected by means of an annular plate 93. In plate 93 there is an opening through which a pipe 94 extends, which pipe also extends upwardly above the upper wall 23, and through which the oxygen gas can be removed from the container 20. To the inner side of the container 91 there is fixed a ring 95 with L-shaped cross section, forming a circumferential gutter. In this gutter there is formed a siphon 96. This siphon 96 comprises a horizontal plate 97 with the shape of a segment of a circle which is fixed to the inner side of the container 91 and a vertical plate 98 fixed to the straight edge of the plate 97 and extending downwardly from there into the ring 95. Into the space defined by the plates 97 and 98 and the container 91 one end of a pipe 99 is debouching, which via a flexible portion is extended to the outside of the container.

Figure 2:
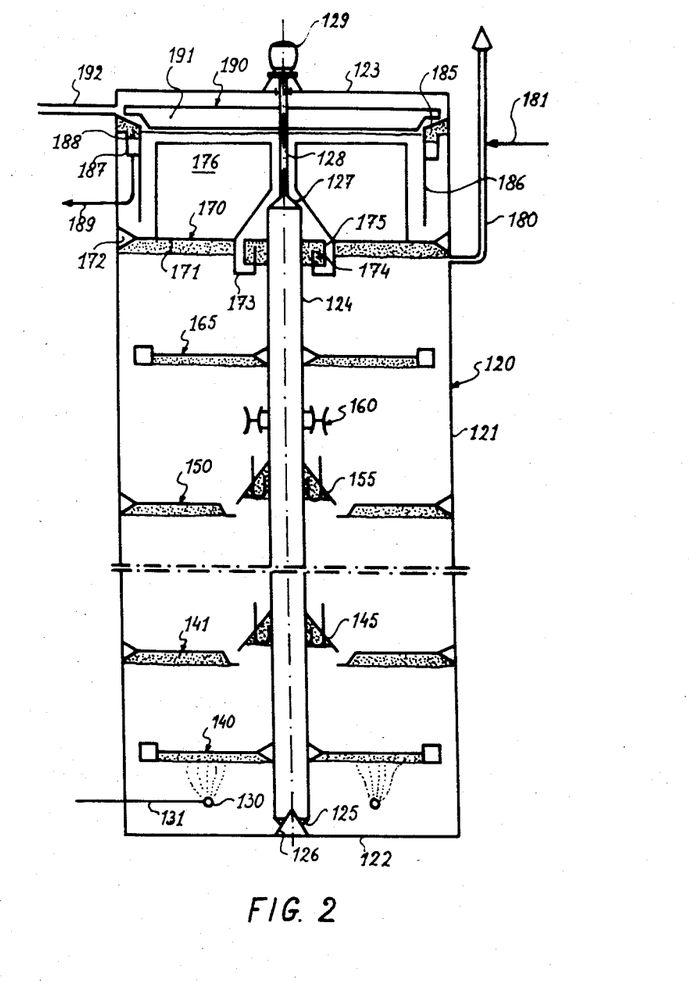
FIG. 2 is a schematic cross section of a second multireactor, as it can be provided in the cleaning system.

The second multireactor shown in FIG. 2 consists of a cylindrical container 120 comprising a cylinder wall 121, a bottom wall 122 and an upper wall 123. The container 120 rests with its bottom wall 122 on a foundation, not shown, in such a way that the cylinder wall 121 is positioned vertically. Coaxially with the cylinder wall 121 a hollow pipe 124 is provided in the container 120, the bottom end of said pipe being rotatably supported by the bottom plate 122. This bottom end of the pipe 124 is constituted by a wall portion 125 having the form of a truncated cone cooperating with a conical part 126 connected to the bottom plate 122. A number of openings is provided in the wall portion 125. The upper end of the pipe 124 is also constituted by a wall portion 127 having the form of a truncated cone, which wall portion 127 is also provided with openings. A stub shaft 128 is connected with the wall portion 127 and extends through an opening in the upper wall, and outside the container 120 it is connected with an electromotor 129 supported by the upper wall 123.

In the container 120 a number of horizontally positioned annular partition walls is provided, which either are connected to the inner side of the cylinder wall 121, or to the pipe 124, thereby dividing the container into a number of reaction spaces. In the lowest part of the container 120 a supply system for oxygen gas is provided which system in the embodiment shown comprises a circularly formed pipe 130 provided with a number of openings and a supply pipe 131, one end of which is connected to the circularly formed pipe 130 and the other end extending outside the container 120 and being connected to a system (not shown) for supplying the oxygen gas.

As seen from the bottom upwards a first partition wall 140 is provided, the construction of which is identical to the construction of the partition wall 40 described with respect to FIG. 1. Above the partition wall 140 there is provided a partition wall 141 the construction of which corresponds to the construction of the partition wall 41 described with respect to FIG. 1.

Above the partition wall 141 there is provided a conical wall 145 the construction of which is identical to the construction of wall 48 described with respect to FIG. 1, and above this the construction comprising the partition wall 141 and the conical wall 145 is again repeated by the partition wall 150 and the conical wall 155. Above the conical wall 155 there is provided a diffusor 160 the construction of which corresponding to the construction of the diffusor 50 described with respect to FIG. 1, and above the diffusor 160 there is provided a partition wall corresponding to the partition wall 140.

Above the partition wall 165 there is provided a partition wall 170, comprising an annular plate 171 which is fixed to the inner side of the cylinder wall 121 by means of a ring 172 with triangular cross section. The inner edge of the plate 171 supports a ring 173 with U-shaped cross section, the open end of which is directed upwardly and the edge of one flange being connected to the inner edge of plate 171. The other flange of the ring 173 extends into the space 174 defined by the pipe 124 and a ring 175 with L-shaped cross section fixed thereto, said space 174 having an open bottom end. In space 174 there is formed in this way a siphon sealing. On the upper side of the plate 171 there is fixed a number of vertical plates 176, serving as braking plates for the liquid flow in this space and intended to convert said liquid flow into a laminated flow. Immediately under the ring 172 the wall 121 is provided with an opening connected to a pipe 180 through which waste water can be supplied and oxygen gas can be removed. The pipe 180 is provided with a connection 181 through which the waste water can be supplied to the pipe 180.

Near the upper end of the container 120 and to the inner side of the cylinder wall 121 there is fixed the outer edge of a ring 185, sloping downwardly in the direction of the center of the container 120. To the inner edge of the ring 185 a cylinder wall 186 is fixed extending somewhat above the plate 171. A ring 187 with L-shaped cross section is fixed to the outer side of the wall 186 thereby defining an upwardly open ended space 188. In the bottom of the space 188 there is an opening connected to a pipe 189 extending outside the container 120 through which waste water can be removed.

In the upper part of the container 120 a scraper 190 is fixed to the stub shaft 128, said scraper 190 comprising a number of radially directed blades 191. The scum collected by the scraper 190 can be removed via a draining pipe 192 which is connected to the container 120 just above the ring 185.

Figure 3:
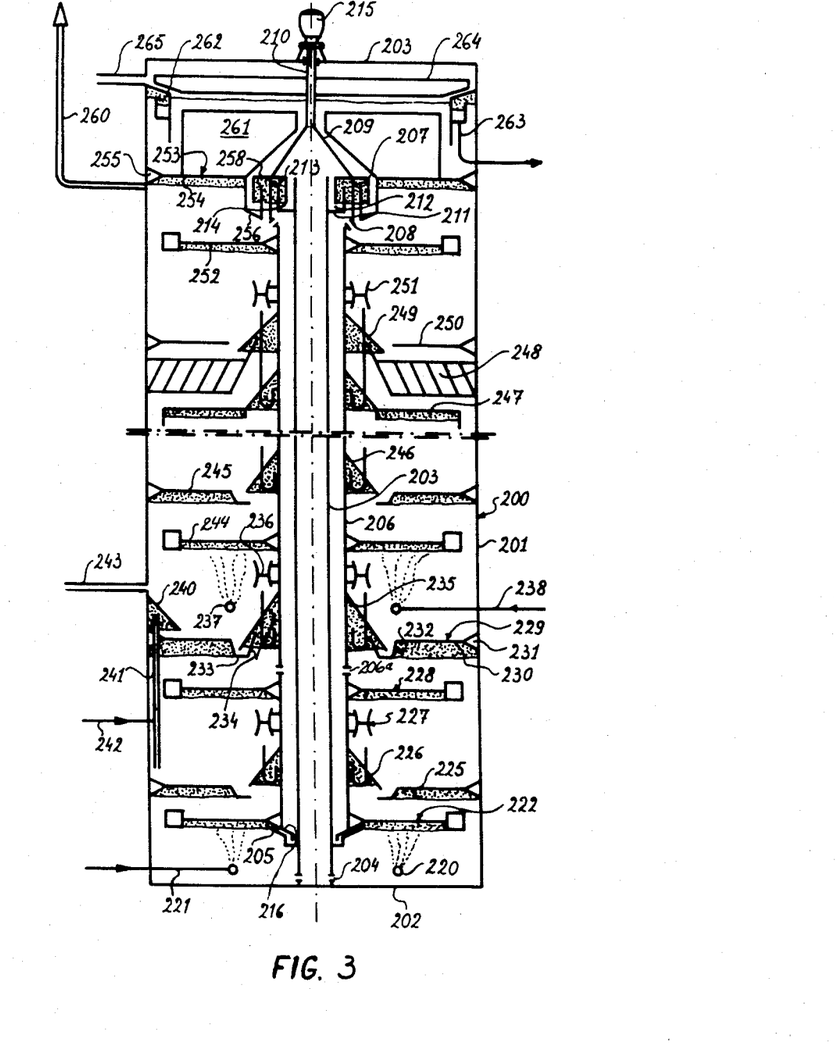
FIG. 3 is a schematic cross section of a third aultireactor, as it can be applied in a device according to the invention.

The third multireactor shown in FIG. 3 consists of a cylindrical container 200 comprising a cylinder wall 201, a bottom wall 202 and an upper wall 203. The container 200 rests with its bottom wall 202 on a foundation, not shown, in such a way that the cylinder wall 201 is positioned vertically. Coaxially with the cylinder wall 201 a hollow pipe 203 is provided in the container 200, the bottom end of said pipe being fixed to the bottom plate 202 and the pipe extending to a defined distance from the upper wall 203. The upper end of the pipe 203 is open, whereas near the bottom end a number of openings 204 is provided in the wall of the pipe 203. Above the openings 204 a ring 205 having the shape of a truncated cone is fixed around the pipe 205. Said ring 205 is cooperating with a ring 216 having the shape of a truncated cone which is fixed to the lower part of a pipe 206. The rings 205 and 216 together with a space below a partition wall 222, which will be described later on, define a siphon-like sealing between the container 201 and the space in the pipe 206, said pipe 206 being coaxially with the pipe 203. Near the upper end of the pipe 203, the pipe 206 has a portion 207 with enlarged diameter, which portion is connected to the pipe 206 by means of a conical wall portion 208, and to the stub shaft 210 by means of a conical wall portion 209. In each wall portion 208 and 209 a number of openings is provided.

Near the upper end of the pipe 203 and fixed to the circumference thereof, a ring 211 with L-shaped cross section is provided, thereby forming an upwardly open gutter 212. The free flange of the ring 211 extends into a space 213 defined by a ring 214 with L-shaped cross section fixed to the inner side of the portion 207. The ring 214 defines a downwardly open space 213. The system consisting of the rings 211 and 214 constitutes a siphon sealing between the spaces in pipes 203 and 206. The stub shaft 210 extends through an opening in the upper plate 203, and outside the container 200 it is connected to a motor 215 supported by said upper plate 203.

In the lowest part of the container 200 a supply system for oxygen gas is provided, which system comprises a circularly formed pipe 220 and a supply pipe 221, and substantially corresponds to the system 30, 31 described with respect to FIG. 1.

In the container 200 a number of horizontally positioned annular partition plates is provided, which either are connected to the inner side of the cylinder wall 201, or to the pipe 206, thereby dividing the container into a number of reaction spaces. As seen from the bottom upwards a first partition wall 222 is provided, the construction of which being identical to the construction of the partition wall 40 described with respect to FIG. 1. Above the wall 221 there is provided a system consisting of a partition wall 225, a conical wall 226 and a diffusor 27, corresponding to the system 41, 48 and 50 as described with respect to FIG. 1. Above this sytem a partition wall 228 is provided corresponding to partition wall 222.

Above the partition wall 228 a partition wall 229 is provided, comprising an annular plate 230 which by means of a ring 231 with triangular cross section is fixed to the inner side of the cylinder wall 201. Fixed to the inner edge of the plate 230 is an edge of a conical wall portion 232, which from plate 230 extends downwardly and inwardly. To the other edge of the wall portion 232 there is fixed a horizontally positioned annular plate 233. Fixed to the inner edge of plate 233 is one edge of a conical wall portion 234, which from said edge is extended upwardly and inwardly, the inner edge being positioned at a defined distance from the circumference of the pipe 206.

Above the wall 229 and fixed to the pipe 206 there is provided a conical wall 235 and a diffusor 236, corresponding substantially to the conical wall 48 and the diffusor 50 as described with respect to FIG. 1. The wall 235 is positioned in such a way and has such dimensions that the wall portion 234 extends into a triangular space defined by the wall 235 and the pipe 206. Above the wall 229 there is also an annular pipe 237 provided with openings for the supply of oxygen gas, which pipe 237 via a pipe 238 is connected to an oxygen gas supply device provided outside the container 200.

Waste water from an upper region of the reaction space next underlying the uppermost chamber space of the container 200 will flow through the openings provided in the conical wall portion 208 of pipe 206 and thence downward in pipe 206 and through openings 206a therein into the reaction space or chamber next underlying the partition wall 220. Thus, the container 220 may be considered as comprising two multireactors, a first one being positioned over the second and separated from it by, though hydrostatically connected with it through, the partition wall means at 229, 234 and 235, with the waste water removing means of the first multireactor serving as the waste water supplying means of the second multireactor.

Above the partition wall 229 and fixed to the inner side of the cylinder wall there is a wall portion 240 comprising a plate in the shape of a nearly half cone. One end of a pipe 241 is situated within the space defined by the wall portion 240, which pipe 241 is extended downwardly through an opening in the partition wall 229 until just above the partition wall 225. By means of a T-joint a pipe 242 is connected to the pipe 241, which pipe 242 is extended through the cylinder wall 201 and connected to the supply of oxygen gas. Above the wall portion 240 there is an opening in the cylinder wall 201, which is connected to a pipe 243, otherwise connected to the supply of waste water.

Above the diffusor 236 and fixed to the pipe 206 there is a partition wall 244 corresponding substantially to the partition wall 40 described with respect to FIG. 1. Above this there is a partition wall 245 and a wall 246 corresponding substantially to the partition wall 41 and the wall 48 as described with respect to FIG. 1. Further upwardly there is provided a system comprising a partition wall 247, a settling device 248, a wall 249, a partition wall 250 and a diffusor, corresponding substantially to the system comprising the partition wall 60, the settling device 75, the wall 80, the diffusor 82 and the partition wall 83 as described with respect to FIG. 1. Above the diffusor 251 there is provided a partition wall 252 corresponding substantially to the partition wall 40 as described with respect to FIG. 1.

Above the partition wall 252 there is provided a partition wall 253 comprising an annular plate 254 which by means of a ring 255 with triangular cross section is fixed to the inner side of the cylinder wall 201. Fixed to the inner side of the plate 254 there is one edge of a flange of a ring 256 with substantially U-shaped cross section, forming an upwardly open gutter. The edge of the other flange of the ring 256 extends into a downwardly open space defined by a ring 258 with L-shaped cross section fixed to the portion 207. By the rings 256 and 258 there is defined a siphon-like sealing. Under the ring 255 there is an opening in the cylinder wall connected to a pipe 260 through which oxygen gas can be removed. A number of radially oriented plates 261 is fixed to the top side of plate 254, in the same way as the plates 176 described with respect to FIG. 2. A siphon-like connection 262 is provided on the cylinder wall 201, which connection 262 corresponds to the connection 185 described with respect to FIG. 2. Waste water can be removed therefrom via a pipe 263. A scraper 263, corresponding to the scraper 190 of FIG. 2 is fixed to the stub shaft 210. Scraped scum can be removed through pipe 265.

Hereafter the process realized by means of the above described multireactors will be described.

The known processes using activated mud for cleaning waste water are based upon the formation of micro-organisms, which originate from the decomposable biochemical compounds available in the waste water, whereby a new cellular material is generated which can easily be separated from the waste water to be cleaned.

The process as such is not homogeneous in that the waste water to be cleaned contained qualitatively different substances, which are decomposed by different kinds of micro-organisms each having their own metabolism. In the known processes use is made of the parameters taking into account the average growth of the micro-organisms and the oxygen management whereby the desired biological reactions can be performed.

The process comprises two phases:

The mixing, during simultaneously supplying oxygen, of the waste water with activated mud and the separation of the activated mud from the cleaned waste water.

The mixing of the activated mud and the waste water, during simultaneously supplying oxygen, is performed in different spaces each having their own flowing characteristics.

The separation of the waste water and the floating micro-organisms is performed either by settling or by flotation. This separation process is performed in separation chambers, either in settling chambers as described with respect to FIG. 1, or in flotation chambers as described with respect to FIG. 2.

Separation chambers and bioreactors can be integrated into one unit. Such a unit is indicated as a multireactor. In this way cleaning devices can be more compact.

It is also possible to combine one multireactor with one or more separation chambers. Such a combination will be indicated as a multireactor combination.

In the known processes there is a relationship between the capacity of the separation chamber and the capacity of the bioreactor. This relationship is dependent upon the concentration of activated mud in the waste water during the cleaning process.

If the amount of activated mud per unit volume of the bioreactor is increased, it is possible to decrease the overall capacity of the bioreactor. Otherwise this requires a longer rest time for the mixture of waste water and micro-organisms in the settling chamber, in order to optimize the separation between the sediment and the activated mud. At a given capacity of the cleaning device it is therefore possible to reduce the dimensions of the device.

The mixing of the waste water with the oxygen and the activated mud in the bioreactor is effected on the one side by using the kinetic energy of the oxygen gas supplied and on the other side by using a mechanical stirring device.

The power required per unit of effective volume of the bioreactor is a measure of the effectiveness of the mixing process, requiring a critical velocity of the liquid, at which velocity sedimentation is impossible. This effectiveness is a measure for the hydraulic characteristics of the bioreactor. In the known bioreactors the power required is more than 20 W/m$^3$.

The supply of oxygen containing gas or pure oxygen in the bioreactor is performed by injecting the gas in the liquid via pipes or grids. By means of the dimensions of the supply openings the dimensions of the formed gas bubbles can be controlled, whereby the effective contact surface between the liquid and the gas can be increased, thereby improving the absorption of oxygen by the liquid. Too small opening can easily be obstructed whereby the flow resistance increases and pressure loss occurs.

The efficiency of the bioreactor is dependent on the extent of use of the oxygen supplied, and especially of the dissolving velocity of the oxygen in the waste water.

The dissolving velocity of the oxygen must be adapted to the oxygen consumed by the activated mud. In this way the oxygen concentration can be maintained at a level necessary to optimize the metabolism of the micro-organisms, which metabolism defines the efficiency of the cleaning process.

If the activated mud consumes per unit of time more oxygen than is dissolved, there will be an oxygen deficiency, whereby the efficiency of the cleaning process decreases.

The cleaning velocity by means of oxygen, also called oxidation capacity, is expressed by the quantity oxygen (gram) per unit of volume ($m^3$) of liquid per unit of time (hour). It is a measure for the increase of concentration of the micro-organisms, which are needed to create the conditions necessary to decompose great quantities of impurities per unit of volume.

The driving power for dissolving the oxygen in the liquid is the so-called oxygen deficiency, which can be defined as the difference between the oxygen concentration in a saturated solution and the oxygen concentration available during the cleaning process.

The oxygen deficiency is the basic parameter for the velocity with which the oxygen is dissolved in the waste water and defines the grade of use of the oxygen supplied.

By the process according to the invention a capacity is achieved with respect to the decomposition of either easily or not easily decomposable substances, the oxygen is dissolved with greater velocity and the consumption of oxygen gas is greater than it was in known processes, whereas at the same time smaller devices can be used for cleaning the waste water.

Essential for this process is that the dissolving of the oxygen in the waste water and the mixing of the waste water with the activated mud is done while the waste water is flowing through one or more multireactors, each multireactor comprising at least two bioreactors connected in series, the hydrostatic pressure and the oxygen dissolving velocity being different in each bioreactor, and the pressure difference between two successive bioreactors being not greater than 7 m water column.

The rest time of the waste water in each bioreactor is at least three minutes, with the oxygen or the oxygen containing gas flowing as a result of the upward pressure and moving through the liquid in the bioreactors in the direction of the bioreactor with the lowest pressure, and the output of the one reactor being connected with the supply of the next reactor.

The gas is flowing through the above cited reactors from the bioreactor with the highest pressure to the bioreactor with the lower pressure. In the upper portion of the bioreactor with the highest pressure the gas is collected, whereupon it is supplied in the form of gas bubbles through a siphon-like pipe to the bioreactor with lower pressure. The dimensions of the gas bubbles are such that these bubbles at a decompression of at most four meter water column are decomposed into smaller gas bubbles.

The mixing of the content of the bioreactor and the even distribution of the gas bubbles in the bioreactors is performed by using the own energy of the gas supplied at the bottom of the bioreactors and the mechanical energy of the mixing device, the total energy supply being less than 20 $W/m^3$ of the capacity of the bioreactor (in favorable conditions even 15 $W/m^3$). In this case the mixing device is driven by one driving motor which is common for the whole multireactor.

Uncontrolled fluid flows between the fixed portions of the separate bioreactors, or of the separation chambers, and moving portions fixed to the driving mechanisms of the bioreactor are prevented by a siphon sealing, using the gas which also serves as supply of oxygen to the bioreactors.

The separation from waste water free from sediment and leaving the multireactor and at the same time the concentration of activated mud to 3% dry mass is effected in the flotation chamber, coupled to the hydrostatic system of the multireactor, in which the magnitude of the hydrostatic pressure in the multireactor is defined in accordance with the level of the overflow gutter from which the mixture waste water, sediment and dissolved gas flows to the flotation chamber. The gas is used to transport the oxygen to the bioreactor having the highest hydrostatic pressure. The decompression of the liquid is defined by the pressure difference between the flotation chamber and the bioreactor from which the liquid is flowing upwardly. This pressure difference is at least seven meter water column.

A high concentration of activated mud in the bioreactors is obtained in that the waste water is flowing through a series of alternate bioreactors and settling chambers which are hydrostatically connected. In the settling chambers the filtering capacity for the mixture waste water and activated mud is choosen in such a way that the concentration of activated mud in the retained mixture is kept at a constant level, which level is dependent upon the defined concentration limit of the mud in the bioreactor.

The mud separated in the settling chamber will be supplied to the next lower bioreactor either by means of gravity or by means of a scraping device. From this bioreactor the content of the settling chamber is replenished.

The decrease of the amount of activated mud during the start up period to a suitable value is performed by periodically drawing off cleaned water from the bioreactor with the lowest pressure, no oxygen being supplied to the multireactor for at least 20 minutes. During this start up period the supply of waste water to the space with the highest pressure is maintained.

The selective development of micro-organisms is maintained by controlling the oxygen deficiency in, as seen in the flowing direction of the waste water, the first bioreactor, using distributors supplying the oxygen gas. In this way oxygen is supplied to two or more bioreactors, the oxygen supply for each bioreactor being independent of the oxygen supply to other bioreactors.

The reaching of the average equilibium of the pressure in successive bioreactors with a periodically changing supply of waste water can be effected by a recirculation between the bioreactors. Such a system satisfies in an arrangement comprising three multireactors. In such an arrangement the multireactors are designated, as seen in the flowing direction of the waste water as the multireactors of the first, second and third degree respectively.

Figure 4:
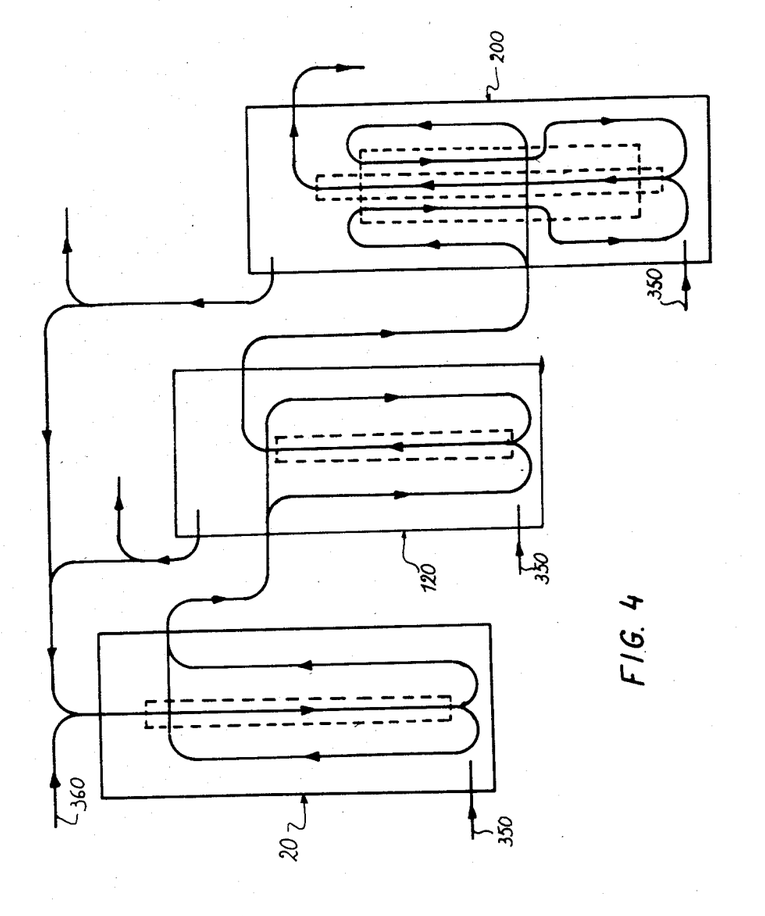
FIG. 4 is a diagram of a complete system according to the invention.

In FIG. 4 a complete system for cleaning waste water is schematically shown, comprising three multireactors connected in series and constructed respectively according to FIG. 1, FIG. 2 and FIG. 3. At 350 there is indicated an oxygen gas supply, whereas the supply of waste water is indicated at 360.

From FIG. 4 the different flows are clear. Otherwise it will be obvious that the system need not always be composed of three multireactors and that, dependent on the pollution content, use can be made of one multireactor, or of a combination of two or more multireactors, their sequence being dependent on the circumstances.

It is also clear that the invention is not restricted to the embodiment as described and shown, but that within the scope of the claims a number of modifications can be applied.

I claim:

1. A process for microbiologically cleaning waste water wherein waste water is treated with oxygen gas and mixed with activated mud, which comprises flowing the waste water through a plurality of mutually superposed reactor chambers in succession at a rate such that the time of retention of the waste water in each reactor chamber is at least three minutes, each said chamber being substantially separated from yet in hydrostatic communication with another in a vertically elongate container; injecting oxygen gas into and mixing the gas in the form of bubbles with the waste water in a lower of said chambers; in at least one of said chambers collecting gas bubbles rising through the waste water into at least one downwardly open horizontally extended pocket holding collected gas in contact with and under hydrostatic pressure from an underlying body of waste water and by said pressure forcing collected gas from said pocket upwardly and into the waste water in an overlying chamber of said container; removing gas from an upper chamber of said container; and in an uppermost chamber thereof separating treated waste water from activated mud for delivery of the treated water from the container; and passing the activated mud downward into an underlying chamber;

said container being sufficiently tall and said flowing of waste water being effected so that the waste water is passed with a decompression of at least seven meters water column from the lowermost of said reactor chambers to said uppermost chamber.

2. A process according to claim 1, further comprising maintaining an average hydrostatic pressure difference of less than four meters water column between the respective bodies of waste water in successive reactor chambers.

3. A process according to claim 1 or 2, said injecting into the waste water in said lower reactor chamber being of oxygen gas supplied from outside said container; and into the waste water in each higher reaction chamber of the container injecting and mixing in the form of bubbles gas forced upwardly by hydrostatic pressure from said pocket holding gas collected from and in contact with the waste water in the next lower of said chambers.

4. A process according to claim 3, said injecting of gas into the waste water in each higher reactor chamber being effected at least in part through at least one tube extending upwardly from a U-shaped lower end portion thereof disposed in a said pocket to an upper end thereof opening into the waste water in the next higher reactor chamber.

5. A process according to claim 4, said mixing of gas into the waste water in each higher reactor chamber being effected least in part by subjecting the waste water therein directly at above said upper end of said at least one tube to a rotating impeller action so as to break up and distribute through the waste water bubbles of the gas delivered from said at least one tube.

6. A process according to claim 1 or 2, and settling activated mud from the waste water in a settling chamber of said container disposed below and in hydrostatic communication with said uppermost chamber and passing the settled mud downward into and mixing it with the waste water in the next underlying reactor chamber.

7. A process according to claim 1 or 2, said injecting into the waste water in said lower reactor chamber being of oxygen gas supplied from outside said container; into the waste water in each higher reactor chamber of the container injecting and mixing in the form of bubbles gas forced upwardly by hydrostatic pressure from a said pocket holding gas collected from and in contact with the waste water in the next lower of said chambers; and settling activated mud from the waste water in a settling chamber of said container disposed below and in hydrostatic communication with said uppermost chamber and passing the settled mud downward into and mixing it with the waste water in the next underlying reactor chamber.

8. A process for microbiologically cleaning waste water wherein waste water is treated with oxygen gas and mixed with activated mud, which comprises flowing the waste water through a plurality of multireactors in succession;

in each said multireactor flowing the waste water through a plurality of mutually superposed, hydrostatically communicating reactor chambers comprised in a vertically elongate container and then into an uppermost chamber therein above and in hydrostatic communication with said reactor chambers, each said container being sufficiently tall and said flowing being effected so that the time of retention of the waste water in each said reactor chamber is at least three minutes and so that the waste water is passed with a decompression of at least seven meters water column from the lowermost of said chambers to said uppermost chambers;

in at least one said reactor chamber of each multireactor injecting oxygen gas supplied from outside the container into the waste water, mixing the gas in the form of bubbles with the waste water, collecting gas bubbles rising though the waste water into at least one downwardly open, horizontally extended pocket holding the collected gas in contact with and under hydrostatic pressure from underling waste water, and by said pressure forcing collected gas upwardly from a said pocket and bubbling it into the waste water in an overlying chamber of the container;

in said uppermost chamber of each said container separating treated waste water from solids for delivery of the treated water from the container;

passing the treated waste water from one of said containers by gravity flow into and then through the next container as the waste water supply thereinto;

and in at least one of said multireactors settling activated mud from the waste water in a settling chamber disposed below and in hydrostatic communication with said uppermost chamber and passing the settled mud downward into and mixing it with the waste water in the next underlying reactor chamber.

9. A process according to claim 8, said injecting of oxygen gas supplied from outside the container being effected into the waste water in a lowermost reactor chamber of each said multireactor, and into the waste water in each higher reactor chamber of the multireactor bubbling gas forced upwardly by hydrostatic pressure from a said pocket holding gas collected from and in contact with the waste water in the next lower reactor chamber of the container.

10. A process according to claim 8 or 9, said flowing of waste water being effected continually with removal of treated waste water from the last of said multireactors but with periodic interruption, for at least twenty minutes in each interruption period, of the oxygen gas supply from outside said containers.

* * * * *